INVENTOR.
KLAUS JUERGEN BOEHNKE
BY Richard Franklin
ATTORNEY

United States Patent Office 3,148,834
Patented Sept. 15, 1964

3,148,834
ILLUMINATION SYSTEM
Klaus Juergen Boehnke, Kelkheim, Taunus, Germany, assignor to Sperry Rand Corporation, New York, N.Y., a corporation of Delaware
Filed Nov. 22, 1961, Ser. No. 154,196
4 Claims. (Cl. 240—41.35)

This invention relates to the field of illumination systems. More particularly it relates to the provision of an improved light station for photo-electric document readers.

Photo-electric document readers of many different types are presently available. Certain of these units, designed to read punched cards for example, have a light station on one side of the data carrier or card and a photodiode or other light sensitive device on the other side. In such machines light from the light station reaches the photo-responsive element through a hole in the data carrier. In other units use is made of reflected light and the light station and light responsive elements are located on the same side of the data carrier. In this latter case the difference in reflected light between an area of the data carrier where there is information recorded and an area where there is no such information recorded is utilized.

Though units using reflected light are more versatile since they can be used with both punched marks and surface marks, difficulties have been encountered resulting from the deficiencies. In the light source used. To obtain an acceptable level of light reflection a relatively intense light must be used and consequently the heat developed is considerable. Since the light station is normally quite close to the data carrier there is insufficient room for installing an efficient air-conditioning system and in any case such system would considerably raise the cost of the machine.

In addition to the above the tubular exciter lamps commonly used for reflected light scanning have had to be made so long (to cover the total area scanned or read at one time) that they are troubled by vibration. A further problem in such lamps is blackening caused by the evaporation of the filament which is not uniformly spread over the entire tube length. Accordingly, after a period of use light from the lamp is no longer uniform. Another drawback to these lamps is that the elongated or tubular exciter lamps must be specially manufactured and are relatively expensive.

In addition to the problem of heat, per se, with existing light stations, there is a related problem. The heat generated increases the turbulence of dust and paper particles which may thereafter settle in the photo-electric field, more particularly on the tube of the light station and/or on the photo-electric element. This adversely affects the reliability required in units used to read documents.

One recent attempt to improve photo-electric document readers has provided a light station which uses an elliptical mirror having a focus at the light source. However, it will readily be seen that this approach only increases the intensity of light on the reflecting area and does not avoid the difficulties pointed out above.

Accordingly, it is an object of this invention to provide an improved illumination system.

It is a further object of this invention to provide an improved illumination system for photo-electric document readers.

Other and further objects and advantages of this invention will become apparent when the following description is read in conjunction with the accompanying drawing. The scope of the invention will be pointed out with particularity in the appended claims.

Figure 1:
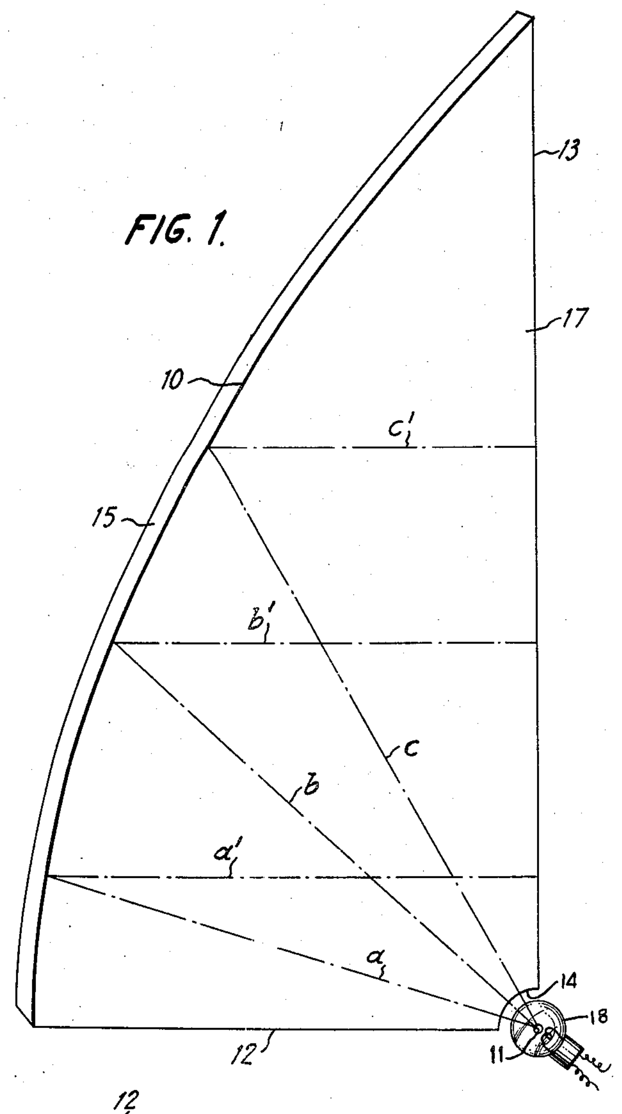
FIG. 1 is a top view of an embodiment of the invention.

Briefly stated the invention provides a zone of light of a certain length and width and having uniform intensity, from a light source which may theoretically be punctiform, by means of a parabolic mirror.

Referring now to the figures wherein the same reference numerals designate the identical part, a unit constructed in accordance with this invention including a solid formed of light transparent material is shown having an edge 10 which is a segment of a parabola with its focus at 11 and its axis of symmetry along edge 12. Edge 13 is parallel to the directrix of the parabolic curve of which edge 10 is a segment. Arc 14 is uniformly distant from focus 11. Surface 15, bounded by edge 10 has a reflecting coating.

A lamp or other primary light source 18 located outside of the solid at focus 11 so that it cannot produce a direct illumination which increases the light output in limited areas will have its rays reflected from surface 15 as is shown by the dotted paths *aa'*, *bb'* and *cc'*. Since the total length of the path traveled by each of these rays is equal, the light at the surface bounded by edge 13 will be uniform.

It will be appreciated that paths *aa'*, *bb'* and *cc'* are, in fact, equal because edge 13 is parallel to the directrix of the curve. Accordingly, the distance from the intersection of line *a* with edge 15, to the directrix is equal to line *a* itself by virtue of the definition of a parabola. It also follows from the fact that edge 13 is parallel to the directrix that distances therebetween are equal at any point so that the sum of the distances from any intersection on the curve to the directrix and the reflected beam, e.g., *a'* from the same intersection, will be equal to any other such sum. Finally, by simple substitution it follows that the path *aa'* is equal to the path *bb'*, is equal to the path *cc'*, etc.

Figure 2:
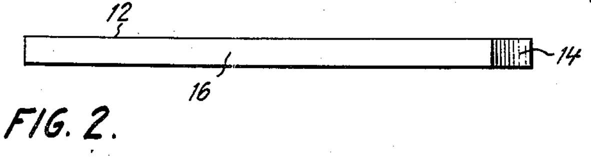
FIG. 2 is an end view of the invention, looking toward edge 12.

The intensity and other chacateristics of the reflected light appearing at the surface bounded by edge 13 may be changed as desired by making the surface of light entry, i.e., the surface bounded by arc 14, and/or the surface of light exit, i.e., the surface bounded by edge 13, and/or reflecting surface 15, concave or convex or by adding suitable lenses or lens systems as desired. In addition, the surface bounded by edge 12 indicated as 16 in FIG. 2, and the surface bounded by edges 10, 12, 13 and 14, indicated as plane 17 in FIG. 1 and its counterpart plane, may be coated with a reflective coating. Additionally, if desired, the various surfaces and planes referred to above could define a hollow which might be filled with a light transmitting material different than the material used for the surfaces and planes.

Finally, it should be noted that though the word "light" has been used throughout, this should not be taken as limiting the invention to radiant energy having frequencies in the visible portion of the spectrum.

While there has been shown and described what is presently considered to be the best mode and preferred embodiment of the invention it should be understood that variations and modifications therein can be made as will be clear to those skilled in the art and, accordingly, the scope of the invention is intended to be limited only by the appended claims.

What is claimed is:

1. A light transparent solid comprising a pair of planes bounded by the following surfaces; a first surface defining a segment of a parabolic curve, a second surface coincident with the axis of symmetry of said curve, a third surface parallel to the directrix of said curve and extending toward said surface coincident with the axis of symmetry from a point on said curve and on a line passing substantially through the focus of said curve, and a fourth surface joining said third surface with said second surface, said fourth surface defining a segment of a circle which has its center at the focus of the parabola, said focus being outside said solid, and a light reflective coating on at least a portion of said first surface.

2. A light transparent solid having one surface defining a section of a parabolic curve, a second surface along the axis of symmetry of said curve, a surface parallel to the directrix of said curve extending toward said axis of symmetry from a point on said curve and on a line passing substantially through the focus of said curve, and a surface defining a segment of a circle having its center at the focus of said curve and connecting said last two surfaces, a light reflecting coating on said parabolic surface and a light source at said focus.

3. The apparatus defined in claim 2 wherein the planes bounded by said surfaces are substantially parallel and coated with a light reflecting coating.

4. Light, illumination apparatus comprising in combination first and second identical substantially parallel planes each of said planes having a first edge defining a segment of a parabola, a second edge along the axis of symmetry of said parabola, a third edge parallel to the directrix of said parabola and extending from a point on said parabola toward the focus of said parabola on a line passing substantially through the focus of said curve, and a fourth edge connecting said second and third edges, each point along said fourth edge of each of said surfaces being equidistant from the focus of said parabola, said focus being external to said planes, a light reflecting surface connecting said first edges, an emitting surface connecting said third edges, surfaces connecting said second and fourth edges, and light transmitting material within the space between said planes.

References Cited in the file of this patent

UNITED STATES PATENTS

| | | |
|---|---|---|
| 2,745,946 | Protzmann | May 15, 1956 |
| 2,770,712 | Dros | Nov. 13, 1956 |
| 2,900,949 | Baker | Aug. 25, 1959 |

FOREIGN PATENTS

| | | |
|---|---|---|
| 466,199 | Italy | Oct. 22, 1951 |